(12) United States Patent
Blair et al.

(10) Patent No.: US 6,458,461 B1
(45) Date of Patent: Oct. 1, 2002

(54) RELEASE AGENT COMPOSITION

(75) Inventors: Bryan Michael Blair; Kelly Ann Killeen; Kathryn Dowlen Mullins, all of Lexington, KY (US)

(73) Assignee: Lexmark International, Inc, Lexington, KY (US)

( * ) Notice: Subject to any disclaimer, the term of this patent is extended or adjusted under 35 U.S.C. 154(b) by 0 days.

(21) Appl. No.: 09/730,975

(22) Filed: Dec. 6, 2000

(51) Int. Cl.[7] .................. B32B 9/04; C08G 77/44
(52) U.S. Cl. ............ 428/447; 106/287.13; 399/111; 528/15; 528/25; 528/31; 528/32; 528/34
(58) Field of Search .............. 528/25, 31, 32, 528/34, 15

(56) References Cited

U.S. PATENT DOCUMENTS

| | | | |
|---|---|---|---|
| 3,440,214 A | 4/1969 | Quaal | 260/46.5 |
| 4,040,383 A | 8/1977 | Vandevort | 118/60 |
| 4,083,322 A | 4/1978 | Beckman | 118/70 |
| 4,496,234 A | 1/1985 | Schram | 355/3 FU |
| 4,709,001 A | 11/1987 | Maxson | 528/15 |
| 4,725,658 A | 2/1988 | Thayer et al. | 528/15 |
| 4,764,576 A | 8/1988 | Ogawa et al. | 524/265 |
| 4,806,391 A | 2/1989 | Shorin | 427/288 |
| 4,822,687 A | 4/1989 | Kessel et al. | 428/447 |
| 4,839,443 A | 6/1989 | Akutsu et al. | 525/474 |
| 4,877,854 A | 10/1989 | Hattori et al. | 528/15 |
| 4,879,339 A | 11/1989 | Yoshino et al. | 524/740 |
| 4,900,779 A | 2/1990 | Leibfried | 524/862 |
| 4,906,721 A | 3/1990 | Weitemeyer et al. | 528/29 |
| 4,923,944 A | 5/1990 | Yamada et al. | 528/15 |
| 4,954,597 A | 9/1990 | Revis | 528/15 |
| 4,983,701 A | 1/1991 | Hara et al. | 528/15 |
| 5,041,591 A | 8/1991 | Okawa | 556/434 |
| 5,068,301 A | 11/1991 | Okamura et al. | 528/15 |
| 5,091,445 A | 2/1992 | Revis | 523/212 |
| 5,109,095 A | 4/1992 | Butler | 528/15 |
| 5,117,025 A | 5/1992 | Takago et al. | 556/434 |
| 5,138,012 A | 8/1992 | Riding et al. | 525/478 |
| 5,140,087 A | 8/1992 | Saho et al. | 528/14 |
| 5,145,932 A | 9/1992 | Sasaki et al. | 528/15 |
| 5,166,297 A | 11/1992 | O'Lenick, Jr. | 528/26 |
| 5,168,314 A | 12/1992 | Gunji et al. | 355/283 |
| 5,200,786 A | 4/1993 | Fromm et al. | 355/284 |
| 5,202,734 A | 4/1993 | Pawlik et al. | 355/284 |
| 5,327,203 A | 7/1994 | Rasch et al. | 355/283 |
| 5,386,007 A | 1/1995 | Herzig et al. | 528/12 |
| 5,408,026 A | 4/1995 | Cowan | 528/15 |
| 5,416,183 A | 5/1995 | Sato et al. | 528/15 |
| 5,468,825 A | 11/1995 | Takarada et al. | 528/15 |
| 5,478,907 A | 12/1995 | Kozakai | 528/15 |
| 5,493,045 A | 2/1996 | Bank et al. | 556/479 |
| 5,554,708 A | 9/1996 | Biggs et al. | 528/23 |
| 5,578,381 A | 11/1996 | Hamada et al. | 428/447 |
| 5,783,719 A | 7/1998 | Sun et al. | 556/455 |
| 5,866,261 A | 2/1999 | Kerr, III et al. | 428/447 |
| 5,880,244 A | 3/1999 | Dowlen et al. | 528/15 |
| 5,929,186 A | 7/1999 | Sun et al. | 528/15 |
| 5,929,187 A | 7/1999 | Yoshitake | 528/15 |
| 5,952,442 A | 9/1999 | Dowlen et al. | 528/15 |
| 5,959,056 A | 9/1999 | Beach et al. | 528/15 |
| 5,965,683 A | 10/1999 | Nye et al. | 528/31 |
| 5,981,679 A | 11/1999 | Takei et al. | 528/15 |
| 5,985,462 A | 11/1999 | Herzig et al. | 428/447 |
| 5,986,022 A | 11/1999 | Austin et al. | 526/65 |
| 6,001,918 A | 12/1999 | Enami et al. | 524/493 |
| 6,001,943 A | 12/1999 | Enami et al. | 528/15 |
| 6,005,036 A | 12/1999 | Carrozza et al. | 524/265 |
| 6,008,310 A | 12/1999 | Itoh et al. | 528/31 |
| 6,030,739 A | * 2/2000 | Ishikawa et al. | 430/108.3 |
| 6,211,323 B1 | * 4/2001 | Akinaga et al. | 528/15 |
| 6,313,193 B1 | * 11/2001 | Simendinger, III | 523/122 |

FOREIGN PATENT DOCUMENTS

JP 3-47481 A * 2/1991

* cited by examiner

*Primary Examiner*—Robert Dawson
*Assistant Examiner*—Marc S. Zimmer
(74) *Attorney, Agent, or Firm*—Kilpatrick Stockton, LLP (57) ABSTRACT

Provided is a release agent composition useful in an electrophotographic process. The composition is comprised of certain heat-stable grafted silicone interpolymers. The interpolymers have a melting point such that it is in the form of a liquid on a hot fuser roll, but solidifies to a waxy solid at room temperature. The compositions of the invention were found to reduce transparency streaking in wiper pad systems and when used in felt roll applications, were found to be equal to silicone oil in transmission ratio and transparency streaking. Accordingly, the release agent compositions are especially efficacious in duplex and transparency printing. The release agent compositions of the present invention also exhibit superior release performance and facilitate clean release of toner from fuser rolls in an electrophotographic imaging process.

47 Claims, 2 Drawing Sheets

RELEASE AGENT COMPOSITION

FIELD OF THE INVENTION

The present invention relates to electrophotographic printing. More specifically, it relates to release agent compositions useful, for example, in conjunction with the hot fuser roll in an electrophotographic printing process.

BACKGROUND OF THE INVENTION

In the process of electrophotography, the light image of an original to be copied is typically recorded in the form of a latent electrostatic image upon a photosensitive member with a subsequent rendering of that latent image visible by the application of electroscopic marking particles, commonly referred to as toner. The visual toner image can be either fixed directly upon the photosensitive member or transferred from the member to another support, such as a sheet of paper, with subsequent affixing of the image thereto.

In order to fix or fuse electroscopic toner material onto a support member permnanently by heat, it is necessary to elevate the temperature of the toner material to a point at which the constituents of the toner become tacky. This action causes the toner to flow to some extent into the fibers or pores of the support member (e.g., paper). Thereafter, as the toner material cools, solidification occurs causing the toner material to become bonded firmly to the support member. In electrophotography, the use of thermal energy for fixing toner images onto a support member is old and wellknown methodology.

One approach to thermal fusing of electroscopic toner images has been to pass the support with the toner images thereon between a pair of opposed roller members, at least one of which is internally heated. During operation of this type of fusing system, the support member to which the toner images are electrostatically adhered is moved through the nip formed between the rolls with the toner image contacting the fuser roll, thereby heating the toner image within the nip. By controlling the heat transfer to the toner, virtually no offset of the toner particles from the copy sheet to the fuser roll is experienced under normal conditions. This is because the heat applied to the surface of the roller is insufficient to raise the temperature of the surface of the roller above the "hot offset" temperature of the toner at which temperature the toner particles in the image areas of the toner liquefy and cause a splitting action in the molten toner resulting in "hot offset". Splitting occurs when the cohesive forces holding the viscous toner mass together is less than the adhesive forces tending to offset it to a contacting surface, such as a fuser roll.

Occasionally, however, toner particles will be offset to the fuser roll by an insufficient application of heat to the surface thereof (i.e., "cold" offsetting). This is generally caused by imperfections in the properties of the surface of the roll, or by the toner particles not adhering to the copy sheet as a result of insufficient adhesion forces. In such a case, toner particles may be transferred to the surface of the fuser roll with subsequent transfer to the back-up roll during periods of time when no copy paper is in the nip.

Moreover, toner particles can be picked up by the fuser and/or back-up roll during fusing of duplex copies or simply from the surroundings of the reproducing apparatus. The presence of such wayward toner particles can result in poor copy quality.

Most fusers of the type described above employ some method of applying a release fluid to the hot roll. Because of their inherent temperature resistance and release properties, silicone oils are typically used to prevent toner from adhering to the surface of the fuser roll and thereby degrading image quality and contaminating the fuser surface. The silicone oil also extends the life of the fuser rollers by providing some measure of lubrication to reduce the wear caused by the cumulative action of tens of thousands of pages passing through the pressure nip of the fuser. In order to ensure the positive effects of the release fluid, a minimum amount of oil (typically 10–500 µg per page for most fuser systems) is required.

Since the oil used as a release agent is partially carried away by the paper passing through the fuser system, it is necessary to ensure that the amount of oil dispensed is not so much that objectionable print quality defects are seen. In extreme cases, the surface of the imaged page can become visibly wet or glossy with oil. In cases of duplex printing (i.e., printing on both sides of the page), a more subtle effect is seen. In such instances, oil is carried back though the printing process by duplexed pages and the oil on those pages is deposited on various machine surfaces, including the photoconductor. It has been found that minute amounts of oil, invisible to the eye, can be enough to drastically affect the transfer of toner from the developer roll to the photoconductor. Since the development process depends upon a scrubbing action between the toned developer and the imaged photoconductor to aid in the transfer of toner from the developer to the photoconductor, and since the scrubbing action is induced by a mismatch in surface speed between the developer and the photoconductor, the addition of silicone oil at the interface of the two surfaces reduces the frictional scrubbing force to a level where transfer of toner can be severely impaired. Such print quality defects are very apparent in fine resolution printing. In extreme cases, the lack of toner transfer is seen even in 12 point text as light print. Excessive levels of oil can cause severe print defects if the distribution of oil across the page is not uniform. Typical print quality defects are white streaks in gray scale, with the streaks parallel to the process direction in areas of high oil concentration.

A typical lubricant metering scheme employed in low-cost desk top printers involves saturating a felt pad constructed of temperature resistant material (such as DuPont's NOMEXO fiber) with silicone oil of a viscosity such that, when combined with the fiber size and density of the felt, the rate of flow out of the felt can be controlled within reasonable limits. Typical construction of a wiper pad includes application of an amount of silicone oil(e.g., 7–8 grams) of viscosity about 30,000 cst (at room temperature) to a precut piece of felt (e.g., fiber diameter 9 microns, felt density=55 oz./yd$^2$.), and baking the felt/oil combination at a high temperature to allow the oil to soak into the felt. Before high resolution printing (1200 DPI) and duplex printing, such a scheme was an excellent metering system, controlling oil flow within a range of 50–500 micrograms per page, with reasonable flow uniformity and no image defects. When this metering scheme is used with 1200 DPI and duplex printing, however, the previously acceptable non-uniform distribution of oil produces oil concentrations in some areas that are high enough to result in the above-described print defects.

Figure 1:
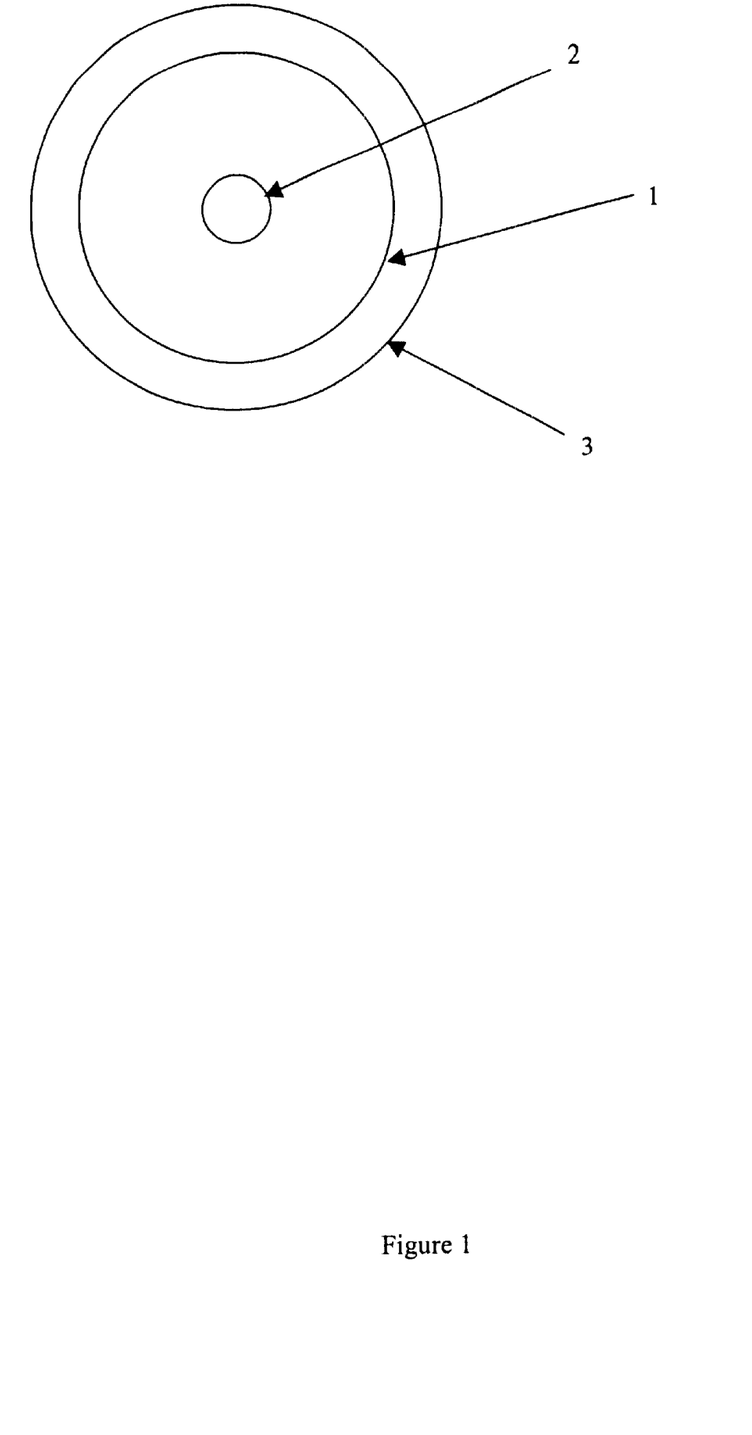

Because of white streaks in gray scale, 100 µg per page is generally the upper limit of a wiper pad with oil. To apply oil more uniformly, a felt roll may be used. The release agent delivery roll can either roll freely or be driven against the hot roll. The release agent is delivered to the surface continually via a reservoir at the center and the capillary action of the outer material. The roll shown in FIG. 1, is comprised of a high temperature paper or non-woven material (i.e., web) (1) which is wrapped around a metal core (2) and saturated with release agent. The reservoir material is then wrapped with a top layer of felt or metering membrane (3) to control the release agent flow from the system. In the preferred embodiment, the metal core shaft is made of aluminum and is 6 mm in diameter; the non-woven material is an aramid/polyester blend and is about 6–8 mm thick; and the metering layer is felt that is about 2–3 mm thick.

Another requirement of the oil application system is that the amount of oil dispensed must be consistent during the life of the applicator (typically for a wiper pad, about 14,000 pages and for a roll, about 50.000 pages). As previously mentioned, failure to maintain adequate oil flow causes toner to adhere to the fuser and reduces the life of the fuser. Also, low flow allows toner to be collected on the felt applicator; when enough toner accumulates, a mass of toner breaks free and adheres to the page, causing another print quality defect called "wiper dump." The felt applicator is a gravity feed system. This means that oil flows out of the felt at a constant rate for a given temperature. Silicone oil continuously flows out of the wiper even if the printer is not printing and is at standby. Thus, if the printer is at standby for a sufficient amount of time, the first page printed will receive an abnormally large amount of silicone oil and show duplex streaks.

In summary, for optimum performance, the release agent oil application system must meet the following requirements:

Sufficient and consistent oil flow over the life of the system to prevent adherence of toner to the fuser roll. This extends fuser life and prevents wiper dumps. Minimum flow rate of 10 micrograms per page is required.

A maximum flow rate of 500 micrograms per page and uniform flow to prevent image defects when printing high resolution images at 1200 DPI and in duplex mode is required.

The present invention, as described below, provides silicone interpolymers useful in release agent compositions in electrophotographic printing processes.

U.S. Pat. No. 4,185,140 describes polymeric release agents for use on hot fuser rolls in an electrophotographic duplication process. The polymer materials utilized must include functional groups such as carboxy, hydroxy, isocyanate, thioether or mercapto groups. These materials are said to form a thermally stable release layer on the fuser roll which has excellent toner release properties. It is taught that the polymer material may be solid at room temperature, so long as it is a liquid at the temperature of the fuser. The materials disclosed as release agents are not silicone oils or waxes.

U.S. Pat. No. 5,959,056 describes release agent compositions useful in an electrophotographic process. These materials, when used in a wiper pad dispensing system cause streaks on transparencies, which shows up as black lines down the page. The copolymers described also are also useful, in the form of a paste or caulk, for sealing leaks in toner cartridges. Further, U.S. Pat. Nos. 5.952,442 and 5,880,244 describe release agent compositions and copolymers useful for sealing leaks in toner cartridges.

U.S. Pat. No. 5,929,186 teaches release agent compositions and copolymers useful for sealing leaks in toner cartridges, as well as a method for preparing such copolymers.

BRIEF DESCRIPTION OF THE DRAWINGS

FIG. 1 is a cross-sectional depiction of a conventional fuser roll used commercially in electrophotographic printing. A metal core (2) surrounded by a high temperature paper or non-woven material containing release agent (i.e., a web) (1), which is in turn covered by a top layer of felt or metering membrane (3) to control the release agent flow from the system.

FIG. 2 is an illustration of the experimental setup discussed below. A media/substrate (4) is fed in the direction shown through opposed roller members (also referred to herein as a fuser roll) (5), at least one of which is heated and in contact with a fuser release agent roll (6) which applies the release composition of the invention.

SUMMARY OF THE INVENTION

The present invention provides a release agent composition useful in an electrophotographic process. The composition is comprised of certain heat-stable grafted silicone interpolymers. The interpolymers have a melting point such that it is in the form of a liquid on a hot fuser roll, but solidifies to a waxy solid at room temperature. The silicone interpolymers of the present invention were found to reduce transparency streaking in wiper pad systems, and when used in a felt roll application system, were found to be equal to silicone oil in transmission ratio and transparency streaking. The transparency image quality is measured by the transmission ratio. Higher transmission ratios indicate more transparent images. Accordingly, the release agent compositions of the present invention are especially efficacious in duplex and transparency printing. The silicone interpolymers of the present invention exhibit superior release performance and facilitate clean release of toner from fuser rolls in an electrophotographic imaging process. Also provided are fuser rolls, felt webs and wipers having the release agent compositions of the present invention coated thereon or incorporated therein.

DETAILED DESCRIPTION OF THE INVENTION

A silicone wax must meet the following requirements to be useful as a release agent in a laser printer:

High Thermal Stability

The wax can have no odor throughout the life of the composition and should not appreciably change physical properties, such as viscosity.

Melt Viscosity

The wax must have a melt viscosity from about 250 to about 10,000 centipoise, preferably from about 250 to about 1,000 centipoise, most preferably about 500 cps, at about 70° C. This matches silicone oil viscosity at fusing temperature and allows the wax to be directly substituted into the felt roll dispensing system.

Melting Point

The wax must have a melting point between about 35° C and about 80° C. If the melting point is below about 35° C., the wax will not solidify when the printer is running at full speed and the cartridge is hot; thus, duplex streaks can occur. If the melting point is above 80° C., the wax will solidify on the backup roll when printing heavy media and collect paper dust and toner which could cause the media to wrap the backup roll.

Flow Rates

Further, at standard flow rates, the wax must not produce streaks on transparencies. This is accomplished by having a flow rate of less than about 800 micrograms per page.

Thus, in a first aspect of the invention, there is provided a polymer, useful in release agent compositions, comprised of repeat units of the formulae:

wherein
R is independently selected from a $C_1$–$C_6$ alkyl or phenyl group;
$R^1$ is independently selected from a $C_2$–$C_{14}$ alkyl and/or a $C_{15}$–$C_{60}$ alkyl,
$R^2$ is a group of the formula —$R^3$—$Si(R^4)_3$; wherein $R^3$ is $C_1$–$C_8$ alkyl; $R^4$ is a $C_1$–$C_6$ alkyl or phenyl group;
$R^5$ is a group of the formula —$R^3$—$[Si (R^6)_2]_n$—$Si(R)_3$; and
$R^6$ is $C_1$–$C_6$ alkyl, phenyl, or —$OSi(CH_3)_3$;
wherein
n is 0–10;
w is 0–500;
x is 0–100;,
y is 0–100; and
z is 0–100; provided that
y+z=1 to 100 and provided that the ratio of w: (x+y+z) is from 0:1 to 1:0.03; and wherein the weight average molecular weight of the polymer is from about 5,000 to 250,000.

In the above polymers, the monomeric unit having the subscript "w" tends to impart properties of a siliconic oil to the overall polymer in proportion to the other monomeric species.

The monomeric unit having the subscript "x" tends to impart the properties of a wax to the overall polymer, in proportion to the other monomeric species.

The monomeric units having the subscript "z" tend to impart the properties of a siliconic oil to the overall polymer in proportion to the other monomeric species.

In the above formulae, it is preferred that w is 35 to 65, x is 2 to 40, z is 2 to 20, and y is 0. It is further preferred that R is either methyl or phenyl, that $R^3$ is methylene, ethylene, propylene or butylene, $R^4$ is methyl, and $R^6$ group is methyl.

Preferred interpolymers of the present invention are terminated with groups of the formulae:

wherein
$R^7$ is independently selected from a $C_1$–$C_6$ alkyl or phenyl, and is preferably methyl.

The polymers of the present invention preferably have a weight average molecular weight of about 20,000 to about 200,000, most preferably about 20.000 to about 70.000. It is further preferred that the polymer be "heat stable"; in other words, it is preferred that such polymers are capable of being held at about 210° C. for a period of three months with no significant change in color, odor, viscosity or molecular weight.

As noted above, the polymers of the invention are useful in release agent compositions. Accordingly, in a further aspect of the invention, there is provided a release agent comprising (I) a polymer comprised of repeat units of the formulae:

wherein
R is independently selected from a $C_1$–$C_6$ alkyl or phenyl group;
$R^1$ is independently selected from a $C_2$–$C_{14}$ alkyl and/or a $C_{15}$–$C_{60}$ alkyl;
$R^2$ is a group of the formula —$R^3$—$Si(R^4)_3$; wherein $R^3$ is $C_1$–$C_8$ alkyl; $R^4$ is a $C_1$–$C_6$ alkyl or phenyl group; and
$R^5$ is a group of the formula —$R^3$—$[O Si (R)_2]_n$—$OSi (R^6)_3$
R6 is $C_1$–C6 alkyl, phenyl, or —$OSi(CH3)_3$;
wherein
n is 0–10;
w is 0–500;
x is 0–100;
y is 0–100; and
z is 0–100; provided that
y+z=1–100 and provided that the
ratio of w: (x+y+z) is from 0:1 to 1:0.03; and wherein the weight average molecular weight of the polymer is from about 5.000 to 250,000; and
(II) up to 50 weight percent of silicone oil; and
(III) at least one antioxidant.

The release agent composition of the present invention preferably comprises from about 50% to about 97%, preferably from about 75% to about 95%, of the polymer described above. The melt viscosity is particularly important because it is one of the major factors in determining the rate at which the release composition is dispensed onto the fuser roll. The viscosity of the polymer is optimized for the particular dispensing means used. Preferably, the melt viscosity of the composition is from about 250 to 10,000 cps at about 70° C., more preferably from about 250 to 1,000 cps at 70° C., and most preferably about 500 cps at about 70° C. The melting point of the polymer is also critical because it is the melting point that will determine whether the composition is actually a liquid on the (heated) fuser roll and a solid when cooled on the printed paper. The polymer should, therefore, have a melting point of from about 35° C. to about 80° C., preferably about 50° C. to about 70° C. and most preferably about 60° C.

The melt viscosity of the polymer may be adjusted in several ways to ensure that it falls within the required range and is optimized within that range for the particular electrophotographic device involved. Two ways to adjust the viscosity is to control the viscosity of the hydride siloxane copolymer by using a chainstopper, or by controlling the level of crosslinking of the copolymer while it is being formed. Another way to adjust the viscosity is to add a viscosity control agent to the release composition. When used, these agents generally comprise from about 0.5% to about 30%, preferably from about 10% to about 25% and most preferably about 20% of the composition, by weight. The particular agent selected may either be added to increase the viscosity or decrease the viscosity of the composition.

Examples of useful viscosity modifying agents include amorphous (fumed) silica (especially amorphous silica having a hexamethyldisiloxane surface treatment), silicone oil, and mixtures thereof. The preferred viscosity control agent is silicone oil, 30,000 centistoke. In addition to adjusting the viscosity of the composition, the silicone oil also enhances the lubricating ability and adjusts the flow rate of the composition.

Since the release agent compositions of the present invention are used under a variety of temperature conditions (the high temperatures of the fuser roll as well as the ambient room temperature) it is important that the composition, and particularly the copolymer, be stable so as to eliminate any odor, decomposition and crosslinking problems which may occur. This may be accomplished by adding an antioxidant to the composition to provide thermal stability at the fusing temperatures. When used. the antioxidant generally comprises about 3% to about 25%, preferably about 8% to about 20%, and most preferably about 17%, by weight, of the composition. Although use of the antioxidant is preferred, if it is used at too high levels, undesired "foil streaks" may be seen on printed copies. Any conventional antioxidant may be used. Moreover, mixtures of antioxidants which operate by different mechanisms are preferred. Examples of such useful antioxidants include the following classes of materials:

(a) free radical scavengers—such as hindered phenols.

(b) phosphite materials; and (c) hydroperoxide decomposers—such as thiodipropionate materials; and (d) mixtures of these materials.

A particularly preferred mixture of antioxidants includes IRGANOX 1010 (a hindered phenol type antioxidant, commercially available from Ciba Specialty Chemicals), CYANOX STDP (distearylthiodipropionate, commercially available from Cytec Industries), and MARK 2112 (a high temperature phosphite antioxidant, commercially available from Witco Corp.).

A typical fuser assembly (i.e., a "fuser roll" as referred to herein) for use in an electrophotographic process comprises a heated roll structure including a hollow cylinder or core having a suitable heating element disposed in the hollow portion thereof which is coextensive with the cylinder. The heating element may comprise any suitable type of heater for elevating the surface temperature of the cylinder to operational temperatures, which are generally from about 250° F. to about 400° F. (i.e., from about 115° C. to about 204° C.) and, for example, may be a quartz lamp. The cylinder may be fabricated from any suitable material, i.e., a material which will not only transfer heat to the surface to provide the temperature required for fusing toner particles, but also a material having a surface which is capable of interacting with the release agent compositions of the present invention to form an interfacial or barrier layer to toner between the release layer and the surface of the barrier fuser roll to prevent toner particles from contacting the fuser surface.

Typical fuser roll materials include anodized aluminum and alloys thereof, steel, stainless steel, nickel and alloys thereof, nickel-plated copper, copper, glass, zinc, cadium and the like, as well as various combinations of these materials. Alternatively, the core may be a rigid steel core having an elastomeric layer thereon. The cylinder may also be fabricated from any suitable material which is nonreactive with the release agent compositions as long as the surface of the cylinder is coated with a material capable of accomplishing the goals of the invention. Surface temperature of the fuser roll may be controlled by means known per se in the art. See, for example, U.S. Pat. No. 3,327,096, incorporated herein by reference.

In general the fuser assembly further comprises a backup member, such as a roll or belt structure which cooperates with the fuser roll structure to form a nip through which a copy paper or substrate passes such that the toner images thereon contact the fuser roll structure. The backup member may comprise any suitable construction, for example, a steel cylinder or a rigid steel core having an elastomeric layer thereon, or it may be a suitable belt material which provides the necessary contact between the fuser roll and the substrate carrying the developed latent image. The dimensions of the fuser roll and the backup member may be determined by one skilled in the art and generally are dictated by the requirements of the particular electrophotographic apparatus in which the fuser assembly is employed, the dimensions being dependent upon the proven speed and other parameters of the machine. Means may also be provided for applying a loading force in a conventional manner to the fuser assembly to create nip pressures on the order of from about 10 to about 100 psi average.

Thus, in a further aspect of the invention, there is provided a fuser roll treated with the release agent compositions of the present invention. Such compositions are applied in an amount sufficient to cover the surface of the fuser roll with at least a continuous low surface energy film in order to prevent the nonreactive thermoplastic toner resin from contacting the surface of the fuser and to provide a surface which releases the thermoplastic toner resin heated by the fuser.

As referred to above, the release agent composition of the present invention may be applied to the fuser roll using several alternative methodologies. In general, such methodologies comprise the use of an absorbent pad, comprising a felt pad constructed from a temperature resistant fiber, such as DuPont's NOMEX® fiber, said pad impregnated with an effective amount of the release agent composition of the present invention. Thus, in a further aspect of the invention there is provided an absorbent pad having coated thereon or impregnated therein the release agent composition of the present invention. Further, absorbent members such as pads or fibers in various forms may be utilized in the forms of webs, rolls, wicks, wipers and brushes. See, for example. U.S. Pat. Nos. 5,327,203; 4,040,383; 4,083,322; 5,200,786: and 5,202,734, incorporated herein by reference. As such, these absorbent members form part of an overall release agent management system capable of applying the desired amount of the release agent composition to the fuser to effect high quality electrophotographic imaging.

Accordingly, as a further aspect of the invention, there is provided an absorbent member having coated thereon or impregnated therein in the release agent composition of the present invention.

The interpolymers of the present invention may be synthesized by any method known in the art, including the methodology set forth in U.S. Pat. No. 5,959,056, incorporated herein by reference. The steps generally include the copolymerizatoin of a cyclic siloxane compound as depicted below and silicone hydride components to form a silicone prepolymer and then grafting the various side chains onto that prepolymer:

Step 1

*The grafted moieties are utilized in the desired stoichiometric proportions to prepare the interpolymers of the present invention.

EXPERIMENTAL SECTION

EXAMPLE 1

A flask, equipped with a mechanical stirrer, condenser, and N2/vacuum inlet, was charged with 16.6 g polymethylhydrosiloxane (PMHS, Gelest), 17.3 g triacontene (Chevron), and 200 mL toluene. The mixture was degassed, then heated to 70° C. under a positive $N_2$ flow. A solution of platinum-divinyltetramethyldisiloxane complex (PtDTD) in xylene (10 μL, PtDTD, Gelest) was added (t=0 min), and the mixture stirred 20 minutes. A second aliquot of PtDTD (10 μL) was added (t=20 min) and the mixture again stirred 20 minutes. Vinylpentamethylsiloxane (16.6 g, Gelest) and PtDTD (10 μL) were added (t=40 min). After 20 minutes, another aliquot of PtDTD (10 μL) was added (t=60 min). The mixture stirred 20 minutes, then 20 mL 1-hexene (Aldrich) and PtDTD (10 μL) were added (t=80 min). After 20 minutes (t=100 min), the final aliquot of PtDTD (20 μL) was added and the reaction stirred an additional 20 minutes (t=120 min). An anti-oxidant package, comprised of CYANOX STDP (5.5 g; Cytek Industries). IRGANOX 1010 (1.52 g; Ciba Geigy), and Mark 2112 (1.01 g; Witco Corp.), was added to the polymer solution in toluene, and stirred well. The mixture was poured into a dish and dried in an explosion proof oven at 80° C. overnight.

EXAMPLE 2

A flask, equipped with a mechanical stirrer, condenser, and N2/vacuum inlet, was charged with octamethylcyclotetrasiloxane (32 g; D4; Dow Corning), PMHS (14.8 g), and acid leached bentonite (0.13 g; grade F20-X, Engelhard). The mixture was heated at 90° C. overnight (at least 16 hours). After cooling to room temperature, toluene (140 mL) and triacontene (17.3 g) were added. The mixture was degassed, then heated to 70° C. under a positive $N_2$ flow. PtDTD catalyst (25 μL) was added (t=0 min), and the mixture stirred 20 minutes. A second aliquot of PtDTD (25 μL) was added (t=20 min) and the mixture again stirred 20 minutes. Vinylpentamethylsiloxane (15.1 g) and PtDTD (25 μL) were added (t=40 min). After 20 minutes, another aliquot of PtDTD (25 μL) was added (t=60 min). The mixture stirred 20 minutes, then 12 ml. 1-hexene and PtDTD (25 μL) were added (t=80 min). After 20 minutes (t=100 min), the final aliquot of PtDTD (25 μL) was added and the reaction stirred an additional 20 minutes (t=120 min). An anti-oxidant package., comprised of CYANOX STDP (9.1 g), IRGANOX 1010 (1.82 g), and MARK 2112 (2.73 g), was added to the polymer solution in toluene, and stirred well. The mixture was poured into a dish and dried in an explosion proof oven at 80° C. overnight.

EXAMPLE 3

A flask, equipped with a mechanical stirrer, condenser, and N2/vacuum inlet, was charged with PMHS (10 g), allyltriphenylsilane (17.55 g; Aldrich), and 200 mL toluene. The mixture was degassed, then heated to 70° C. under a positive $N_2$ flow. PtDTD catalyst (5 μL) was added (t 0 min), and the mixture stirred 20 minutes. A second aliquot of PtDTD (5 μL) was added (t=20 min) and the mixture again stirred 20 minutes. Vinylpentamethylsiloxane (10 g) and PtDTD (5 μL) were added (t=40 min). After 20 minutes, another aliquot of PtDTD (5 μL) was added (t=60 min). The mixture stirred 20 minutes, then 10 mL 1-hexene and PtDTD (5 μL) were added (t=80 min). After 20 minutes (t=100 min), the final aliquot of PtDTD (5 μL) was added and the reaction stirred an additional 20 minutes (t=120 min). An anti-oxidant package, comprised of CYANOX STDP (1.2 g), IRGANOX 1010 (0.25 g), and Mark 2112 (0.3 g), was added to the polymer solution in toluene, and stirred well. The mixture was poured into a dish and dried in an explosion proof oven at 80° C. overnight.

TABLE 1

| Release Agent | mass/area* | 130 | 135 | 140 | 145 | 150 | 155 | 160 | 165 | 170 |
|---|---|---|---|---|---|---|---|---|---|---|
| Dry | 1 | 0 | 0 | 0 | 0 | 0 | 0 | xxx | xxx | xxx |
|  | 2 | 0 | 0 | 0 | 0 | 0 | HO | xxx | xxx | xxx |
| 1000 cst Nomex Roll | 1 | 0 | 0 | 0 | 0 | 0 | 0 | 0 | xxx | xxx |
|  | 2 | 0 | 0 | 0 | 0 | 0 | 0 | HO | xxx | xxx |
| Wax 1 - Nomex Roll | 1 | 0 | 0 | 0 | 0 | 0 | 0 | 0 | 0 | 0 |
|  | 2 | 0 | 0 | 0 | 0 | 0 | 0 | 0 | 0 | HO |
| Wax 2 - Nomex Roll | 1 | 0 | 0 | 0 | 0 | 0 | 0 | 0 | 0 | xxx |
|  | 2 | 0 | 0 | 0 | 0 | 0 | 0 | 0 | HO | xxx |
| Oil Web Trial 1 | 1 | 0 | 0 | 0 | 0 | 0 | 0 | 0 | xxx | xxx |
|  | 2 | 0 | 0 | 0 | 0 | 0 | 0 | HO | xxx | xxx |
| Oil Web Trial 2 | 1 | 0 | 0 | 0 | 0 | 0 | 0 | 0 | xxx | xxx |
|  | 2 | 0 | 0 | 0 | 0 | 0 | 0 | HO | xxx | xxx |
| Optimized Wax A Nomex Roll - Trial 1 | 1 | 0 | 0 | 0 | 0 | 0 | 0 | 0 | xxx | xxx |
|  | 2 | 0 | 0 | 0 | 0 | 0 | 0 | 0* | xxx | xxx |
| Optimized Wax A Nomex Roll - Trial 2 | 1 | 0 | 0 | 0 | 0 | 0 | 0 | 0 | xxx | xxx |
|  | 2 | 0 | 0 | 0 | 0 | 0 | 0 | HO | xxx | xxx |

*The release tests where completed using two levels of toner mass coverage or mass per unit area (m/a). The amount of mass influences release, with more toner mass being more difficult to release. The levels of mass listed in Table 1 are relative. M/A Level 2 has twice as much toner as M/A Level 1. In all cases tested, the higher M/A level (level 2) failed first.

DISCUSSION OF RESULTS

Referring to Table 1 above, several release agents have been tested to determine how well they aid in the clean release of toner from the fuser. For each case, a "0" indicates a clean release while a "HO" indicates a hot offset condition. "XXX" indicates not run and 0* indicates the sample released freely from the fuser but some hot offset of toner occurred. No release agent performed the worst. The oil web and 1000cst silicone oil NOMEX® roll each improved the window by 10° C. over the dry release case, the problem with Wax 1 and Wax 2 structures was that both caused unacceptable streaking on transparencies. The optimized wax A showed equivalent release characteristic to the oil web and 1000 cst silicone oil NOMEX® roll but without streaks.

The transparency image quality is measured by the transmission ratio. Higher transmission ratios indicated more transparent images. Each of the optimized wax A trials, the oil web, and the dry release case basically all had the same transmission ratio at a given temperature.

Figure 2:
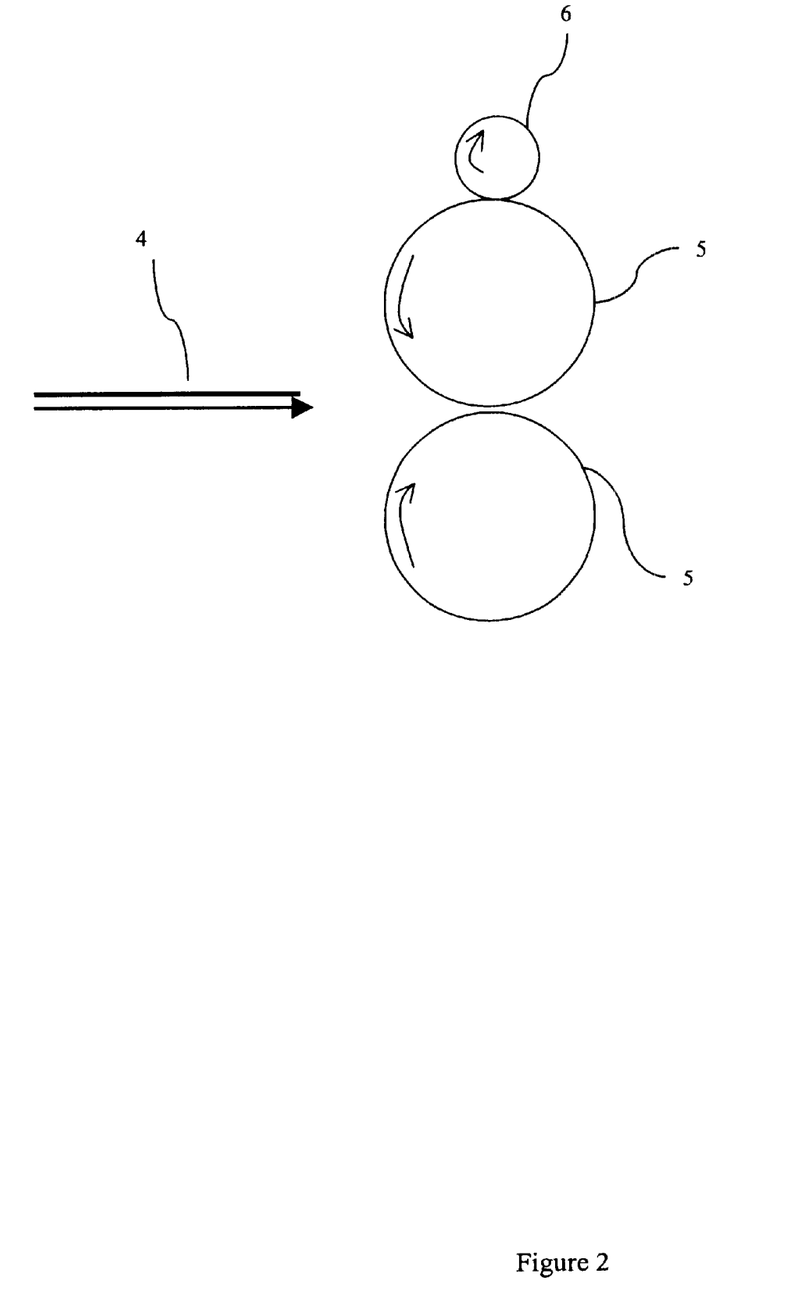

Experimental Setup
1. Fuser roll temperature set.
2. Wax roll spring loaded against top fuser roll, rotates.
3. Media/substrate fed in direction shown in FIG. 2.

We claim:
1. A polymer comprised of repeat units of the formulae:

wherein
R is independently selected from a $C_1$–$C_6$ alkyl or phenyl group;
$R^1$ is independently selected from a $C_2$–$C_{14}$ alkyl and/or a $C_{15}$–$C_{60}$ alkyl;
$R^2$ is a group of the formula —$R^3$—$Si(R^4)_3$; wherein $R^3$ is $C_1$–$C_8$ alkyl; $R^4$ is a $C_1$–$C_6$ alkyl or phenyl group;
$R^5$ is a group of the formula —$R^3$—$[Si(R^6)_2O]_n$—$Si(R)_3$; and
$R^6$ is $C_1$–$C_6$ alkyl, phenyl, or —$OSi(CH_3)_3$;

wherein n is 0–10;

w is 0–500;

x is 1–100;

y is 0–100; and z is 0–100; provided that y+z=1 to 100 and provided that the ratio of w: (x+y+z) is from 0:1 to 1:0.03; and wherein the weight average molecular weight of the polymer is from about 5,000 to 250,000.

2. The polymer of claim 1, wherein x is 0 and y and z are in the range of 5 to 50.

3. The polymer of claim 1, wherein x is about 1 to 30, and y is 1 to 50.

4. The polymer of claim 1, wherein x is about 2 to 20 and z is about 2 to 35.

5. The polymer of claim 1, wherein $R^3$ is methylene, ethylene, propylene or butylene, and $R^4$ is methyl.

6. The polymer of claim 1, wherein $R^3$ is methylene or ethylene and n is 0 to 5.

7. The polymer of claim 1, wherein the weight average molecular weight is from about 20,000 to 70,000.

8. The polymer of claim 1, wherein w is 35 to 65, x is 2 to 40, z is 2 to 20, and y is 0.

9. The polymer of claim 8, wherein R is methyl, $R^3$ is ethylene, and $R^6$ is methyl.

10. The polymer of claim 1, wherein the melt viscosity of the polymer is from about 250 to about 10,000 centipoise at about 70° C.

11. The polymer of claim 1, comprising wherein Me represents methyl.

12. The polymer of claim 1, comprising wherein Me represents methyl.

13. The polymer of claim 1, comprising wherein Me represents methyl and Ph represents phenyl.

14. A release agent composition comprising (I) a polymer comprised of repeat units of the formulae:

wherein
R is independently selected from a $C_1$–$C_6$ alkyl or phenyl group;
$R^1$ is independently selected from a $C_2$–$C_{14}$ alkyl and/or a $C_{15}$–$C_{60}$ alkyl;
$R^2$ is a group of the formula —$R^3$—Si($R^4$)$_3$; wherein $R^3$ is $C_1$–$C_8$ alkyl; $R^4$ is a $C_1$–$C_6$ alkyl or phenyl group;
$R^5$ is a group of the formula —$R^3$—[Si($R^6$)$_2$O]$_n$—Si(R)$_3$; and
$R^6$ is $C_1$–$C_6$ alkyl, phenyl, or —OSi(CH$_3$)$_3$;
wherein
n is 0–10;
w is 0–500;
x is 0–100;
y is 0–100; and
z is 0–100; provided that
y+z=1–100 and provided that the
ratio of w: (x+y+z) is from 0:1 to 1:0.03; and wherein the weight average molecular weight of the polymer is from about 5,000 to 250,000; and (II) up to 50 weight percent of silicone oil; and (III) at least one antioxidant.

15. The composition of claim 14, wherein x is 0 and y and z are in the range of 5 to 50.

16. The composition of claim 14, wherein x is about 1 to 30, and y is 1 to 50.

17. The composition of claim 14, wherein x is about 2 to 20 and z is about 2 to 35.

18. The composition of claim 14, wherein $R^3$ is methylene, ethylene, propyleneor butylene, and $R^4$ is methyl.

19. The composition of claim 14, wherein $R^3$ is methylene or ethylene and n is 0 to 5.

20. The composition of claim 14, wherein the weight average molecular weight is from about 20,000 to 200,000.

21. The composition of claim 14, wherein w is 35 to 65, x is 2 to 40, z is 2 to 20, and y is 0.

22. The composition of claim 21, wherein R is methyl, $R^3$ is ethylene, and $R^6$ is methyl.

23. The composition of claim 14, wherein the melt viscosity of the polymer is from about 250 to about 10,000 centipoise at about 70° C.

24. The release agent composition of claim 14, wherein the polymer comprises wherein Me represents methyl and Ph represents phenyl.

25. A fuser roll having coated thereon an amount effective for release of toner of a release agent composition comprising (I) a polymer comprised of repeat units of the formulae:

wherein
R is independently selected from a $C_1$–$C_6$ alkyl or phenyl group;
$R^1$ is independently selected from a $C_2$–$C_{14}$ alkyl and/or a $C_{15}$–$C_{60}$ alkyl;
$R^2$ is a group of the formula —$R^3$—$Si(R^4)_3$; wherein $R^3$ is $C_1$–$C_8$ alkyl; $R^4$ is a $C_1$–$C_6$ alkyl or phenyl group;
$R^5$ is a group of the formula, —$R^3$—$[Si(R^6)_2O]_n$—$Si(R)_3$; and
$R^6$ is $C_1$–$C_6$ alkyl, phenyl, or —$OSi(CH_3)_3$;
wherein
n is 0–10;
w is 0–500;
x is 0–100;
y is 0–100; and
z is 0–100; provided that
y+z=1–100 and provided that the ratio of w: (x+y+z) is from 0:1 to 1:0.03; and wherein the weight average molecular weight of the polymer is from about 5.000 to 250,000; and
(II) up to 50 weight % of silicone oil; and
(III) at least one antioxidant.

26. The fuser roll of claim 25, wherein x is 0 and y and z are in the range of 5 to 50.

27. The fuser roll of claim 25, wherein x is about 1 to 30, and y is 1 to 50.

28. The fuser roll of claim 25, wherein x is about 2 to 20 and z is about 2 to 35.

29. The fuser roll of claim 25, wherein $R^3$ is methylene, ethylene, propylene or butylene, and $R^4$ is methyl.

30. The fuser roll of claim 25, wherein $R^3$ is methylene or ethylene and n is 0 to 50.

31. The fuser roll of claim 25, wherein the weight average molecular weight is from about 20,000 to 200,000.

32. The fuser roll of claim 25, wherein w is 35 to 65, x is 2 to 40, z is 2 to 20, and y is 0.

33. The fuser roll of claim 32, wherein R is methyl, $R^3$ is ethylene, and $R^6$ is methyl.

34. The fuser roll of claim 25, wherein the melt viscosity of the polymer is from about 250 to about 10,000 centipoise at about 70° C.

35. The fuser roll of claim 25, wherein the polymer comprises wherein Me represents methyl and Ph represents phenyl.

36. An absorbent member having coated thereon or impregnated therein a release agent composition, said composition comprising
(I) a polymer comprised of repeat units of the formulae:

wherein
R is independently selected from a $C_1$–$C_6$ alkyl or phenyl group;
$R^1$ is independently selected from a $C_2$–$C_{14}$ alkyl and/or a $C_{15}$–$C_{60}$ alkyl;
$R^2$ is a group of the formula —$R^3$—$Si(R^4)_3$; wherein $R^3$ is $C_1$–$C_8$ alkyl; $R^4$ is a $C_1$–$C_6$ alkyl or phenyl group;
$R^5$ is a group of the formula —$R^3$—$[Si(R^6)_2O]_n$—$Si(R)_3$; and
$R^6$ is $C_1$–$C_6$ alkyl phenyl, or —$OSi(CH_3)_3$;
wherein
n is 0–10;
w is 0–500;
x is 0–100;
y is 0–100; and
z is 0–100; provided that
y+z=1 to 100 and provided that the ratio of w: (x+y+z) is from 0:1 to 1:0.03; and wherein the weight average molecular weight of the polymer is from about 5,000 to 250,000; and
(II) up to 50 weight % of silicone oil; and
(III) at least one antioxidant.

37. The absorbent member of claim 36, wherein x is 0 and y and z are in the range of 5 to 50.

38. The absorbent member of claim 36, wherein x is about 1 to 30, and y is 1 to 50.

39. The absorbent member of claim 36, wherein x is about 2 to 20 and z is about 2 to 35.

40. The absorbent member of claim 36, wherein $R^3$ is methylene, ethylene, propylene or butylene, and $R^4$ is methyl.

41. The absorbent member of claim 36, wherein $R^3$ is methylene or ethylene and n is 0 to 50.

42. The absorbent member of claim 36, wherein the weight average molecular weight is from about 20,000 to 200,000.

43. The absorbent member of claim 36, wherein the weight average molecular weight is from about 20,000 to 70,000.

44. The absorbent member of claim 36, wherein w is 35 to 65, x is 2 to 40, z is 2 to 20, and y is 0.

45. The absorbent member of claim 44 wherein R is methyl, $R^3$ is ethylene, and $R^6$ is methyl.

46. The absorbent member of claim 36, wherein the polymer comprises wherein Me represents methyl and Ph represents phenyl.

47. The absorbent member of claim 36 wherein said member is selected from the group consisting of pads, webs, wipers, rolls, and brushes.

* * * * *

UNITED STATES PATENT AND TRADEMARK OFFICE
CERTIFICATE OF CORRECTION

PATENT NO. : 6,458,461 B1  
DATED : October 1, 2002  
INVENTOR(S) : Bryan Michael Blair, Kelly Ann Killeen and Kathryn Dowlen Mullins It is certified that error appears in the above-identified patent and that said Letters Patent is hereby corrected as shown below:

Column 5,  
Line 21, correct the formula "$-R^3-[Si(R^6)_2)]_n-Si(R)_3$" to read
-- $-R^3-[Si(R^6)_2O]_n-Si(R)_3$ --.

Column 6,  
Line 20, correct the formula "$-R^3-[O\ Si\ (R)_2)]_n-OSi(R^6)_3$" to read
-- $-R^3-[Si(R^6)_2O]_n-Si(R)_3$ --.  
Line 22, correct the words "R6 is $C_1$-C6 alkyl" to read -- $R^6$ is $C_1$-$C_6$ alkyl --.

Signed and Sealed this

Tenth Day of June, 2003

JAMES E. ROGAN  
*Director of the United States Patent and Trademark Office*